US012667959B2

(12) United States Patent
    Killer et al.

(10) Patent No.:    US 12,667,959 B2
(45) Date of Patent:    Jun. 30, 2026

(54) SYSTEM AND METHOD FOR EXECUTING AN ASSEMBLY TASK BY MEANS OF A ROBOT

(71) Applicant: FFT PRODUKTIONSSYSTEME GMBH & CO. KG, Fulda (DE)

(72) Inventors: Alexander Killer, Wartenberg (DE); Martin Kraft, Eichenzell (DE)

(73) Assignee: FFT PRODUKTIONSSYSTEME & CO. KG, Fulda (DE)

( * ) Notice:    Subject to any disclaimer, the term of this patent is extended or adjusted under 35 U.S.C. 154(b) by 234 days.

(21) Appl. No.: 18/281,678

(22) PCT Filed: Mar. 22, 2022

(86) PCT No.: PCT/EP2022/057492
    § 371 (c)(1),
    (2) Date: Sep. 12, 2023

(87) PCT Pub. No.: WO2022/207409
    PCT Pub. Date: Oct. 6, 2022

(65) Prior Publication Data
    US 2024/0149441 A1    May 9, 2024

(30) Foreign Application Priority Data

Mar. 31, 2021    (DE) ..................... 10 2021 108 201.3

(51) Int. Cl.
    *B25J 9/16*    (2006.01)
    *B25J 9/06*    (2006.01)
    *B25J 11/00*    (2006.01)
(52) U.S. Cl.
    CPC .............. *B25J 9/1612* (2013.01); *B25J 9/06* (2013.01); *B25J 9/1664* (2013.01); *B25J 11/0065* (2013.01)

(58) Field of Classification Search
    CPC . B25J 9/1612; B25J 9/06; B25J 9/1664; B25J 11/0065; B25J 11/005
    (Continued)

(56) References Cited

U.S. PATENT DOCUMENTS 5,890,656 A    4/1999    Fuhlbrigge
8,434,958 B2    5/2013    Rademacher
    (Continued)

FOREIGN PATENT DOCUMENTS

DE        19721824 A1    12/1998
DE    102007053073 A1    6/2009
    (Continued)

OTHER PUBLICATIONS

Office Action (Request for the Submission of an Opinion) issued May 14, 2025, by the Korean Intellectual Property Office in corresponding Korean Patent Application No. 10-2023-7035435 and an English translation of the Office Action. (16 pages).
    (Continued)

*Primary Examiner* — Kira Nguyen
(74) *Attorney, Agent, or Firm* — Buchanan Ingersoll & Rooney PC

(57)    ABSTRACT

A system for executing an assembly task or production task in a verified way includes: an n-axis robot having a base and an articulated arm which is connected to the base and can be moved in n machine axes relative to the base and includes a first articulated-arm portion and a second articulated-arm portion. The system also includes a tool having a first functional element and a second functional element. The first functional element is coupled to the first articulated-arm portion such that it participates in movements which can be performed by the first articulated-arm portion. The second functional element is coupled to the second articulated-arm portion such that it participates in movements which can be (Continued)

performed by the second articulated-arm portion relative to the first articulated-arm portion and first functional element in the robot joint.

20 Claims, 4 Drawing Sheets

(58) Field of Classification Search
USPC ........................................................ 700/245
See application file for complete search history.

(56) References Cited

U.S. PATENT DOCUMENTS

| | | | | |
|---|---|---|---|---|
| 9,006,605 | B2 | 4/2015 | Schneegans et al. | |
| 2015/0147140 | A1* | 5/2015 | Launiere | B21D 43/055 |
| | | | | 414/222.01 |
| 2017/0350479 | A1 | 12/2017 | Shimizu | |
| 2019/0001500 | A1* | 1/2019 | Kitahara | B25J 9/044 |
| 2021/0308877 | A1* | 10/2021 | Riegger | B25J 9/04 |
| 2022/0048192 | A1* | 2/2022 | Meyer-Delius Di Vasto | |
| | | | | B25J 19/04 |

FOREIGN PATENT DOCUMENTS

| | | | | |
|---|---|---|---|---|
| DE | 202008003757 | U1 | 9/2009 | |
| DE | 102012003918 | A1 | 8/2013 | |
| EP | 0846529 | A1 * | 6/1998 | .......... B25J 17/0241 |
| EP | 2307167 | B1 | 3/2016 | |
| EP | 2117745 | B1 | 3/2020 | |
| JP | H09-290381 | A | 11/1997 | |
| JP | 2016-142337 | A | 8/2016 | |
| WO | 2014126675 | A1 | 8/2014 | |
| WO | 2021023871 | A1 | 2/2021 | |

OTHER PUBLICATIONS

International Search Report and Written Opinion issued in PCT/EP2022/057492, mailed Jul. 4, 2022, 12 pages. Partial English translation.
International Preliminary Report on Patentability for International Application No. PCT/EP2022/057492. Original report (German language) mailed Jul. 4, 2022, English translation issued Oct. 3, 2023. 6 pages.

* cited by examiner

SYSTEM AND METHOD FOR EXECUTING AN ASSEMBLY TASK BY MEANS OF A ROBOT

CROSS REFERENCE TO RELATED APPLICATIONS

This application is a U.S. National Phase Application of PCT International Application No. PCT/EP2022/057492, filed Mar. 22, 2022, which claims benefit of priority from German Patent Application No. 10 2021 108 201.3, filed Mar. 31, 2021. The contents of these applications are incorporated herein by reference.

FIELD OF THE INVENTION

The invention relates to a system and a method for executing an assembly task or production task in a verified way. The assembly task can be that of applying a fluid medium, such as in particular an adhesive or glue, to a workpiece. It can for example be applied by being deposited or sprayed. The assembly task can however instead also be that of gripping or reshaping or joining one or more workpieces. The system comprises an n-axis robot, preferably an industrial robot or universal robot, having a base and an articulated arm which is connected to the base and can be moved relative to the base in n machine axes of the robot. The system also comprises a robot controller for controlling and/or regulating the movements of the articulated arm in the n machine axes. The robot controller can in particular be designed to control and/or regulate the robot in all of its degrees of freedom of movement.

BACKGROUND OF THE INVENTION

Articulated-arm robots, such as for example universal robots or industrial robots, which are suitable for the purposes of the invention typically comprise a final articulated-arm portion which is designed to accommodate a tool for executing an assembly task, such as those mentioned above by way of example. Typical tools, such as for example grippers, welding tools, hemming tools and adhesive applying tools, comprise functional elements which can be moved relative to each other and also comprise a drive of their own having one or more rotational and/or translational motors or actuating elements or drives and/or one or more drive unit(s) for one or more of the functional elements. Examples of such tools are known from WO 2014/126675 A1, EP 2 307 167 B1 and EP 2 117 745 B1, all incorporated herein by reference. The tool's own drive requires a drive controller which has to be adapted to the robot controller which is inherently provided, so that the movements of the functional elements of the tool and the movements of the robot for executing the assembly task are co-ordinated. The effort and/or cost involved in this is considerable.

SUMMARY OF THE INVENTION

An aspect of the invention is a system of the type mentioned which exhibits a reduced effort and/or cost.

One aspect can be that of reducing the effort and/or cost which has to be expended with regard to controlling and/or regulating the tool.

It is desirable to reduce the number of components and/or to simplify one or more components of the tool.

The subject of an aspect of the invention is a system having an articulated-arm robot of the type described at the beginning. The n-axis articulated arm of the robot comprises, within its total of n machine axes, a first articulated-arm portion and a second articulated-arm portion which are connected in a robot joint such that they can be moved rotationally about one of the machine axes and/or translationally and axially along said machine axis. The system also comprises a tool for the assembly task, having a first functional element and a second functional element, at least one of which can be moved relative to the other in a way which is co-ordinated for the purpose of performing the assembly task. The first functional element is coupled to the first articulated-arm portion such that it participates in movements which can be performed by the first articulated-arm portion. The second functional element is coupled to the second articulated-arm portion such that it participates in movements which can be performed by the second articulated-arm portion relative to the first articulated-arm portion and first functional element in the robot joint, in order to execute the assembly task. The first functional element can in particular be immovably connected to the first articulated-arm portion, and/or the second functional element can in particular be immovably connected to the second articulated-arm portion.

The first functional element can for example be a housing or a part of welding tongs or some other element which, when it is properly connected to the first articulated-arm portion, cannot be moved relative to the first articulated-arm portion.

The robot controller is designed to control and/or regulate the position and/or speed of the movements which can be performed by the second articulated-arm portion relative to the first articulated-arm portion in the robot joint, so as to activate and perform a movement and/or function of the second functional element in a verified way.

An aspect of the invention uses one of the machine axes of the robot, i.e. one of the machine axes which the robot inherently possesses, to perform the function of the tool. At the same time, the effort and/or cost required to control and/or regulate the system comprising the robot and the tool is reduced by directly integrating the robot controller, which is already provided on the robot, into the function of the tool. The robot drive for the robot joint which connects the first articulated-arm portion and the second articulated-arm portion, i.e. the robot drive for the relevant axis of articulation, can replace a drive motor, for example an electric, pneumatic or hydraulic rotational motor or linear motor, which would otherwise have to be provided on the tool.

At least one of the direction of movement, tracing a predetermined movement curve, the pressure with which the second functional element acts on a workpiece, the period of acting on the workpiece at one point, the rotational angular position of the second functional element and numerous other movement parameters, time parameters and pressure parameters of the second functional element can for example be controlled or regulated in accordance with the assembly task to be executed.

Preferably, either the first articulated-arm portion or in particular the second articulated-arm portion is a final articulated-arm portion of the robot which is distanced from the base by the n machine axes. This articulated arm portion can also be referred to as the robot hand.

The first functional element can comprise a device for protecting the second functional element, wherein said protective device is for example elastically telescopic or can be moved to the side and is moved relative to the first articulated-arm portion in order to expose the second functional element when the tool for executing the assembly task is guided to a workpiece. Even then, the first functional element does not move relative to the first articulated-arm portion within the meaning of this application. The protective device can comprise a suction device, such that chips which for example accumulate during a machining process and/or a supplied coolant can be removed at their point of origin. The protective device can also seal the processing space, such that it is for example possible to operate in a protective gas atmosphere or using a liquid coolant.

A sensor, for example an imaging sensor, can also be connected to the first functional element and/or first articulated-arm portion, using which it is in particular possible to check and monitor the quality of the work performed, the condition of the processing region prior to processing and/or the position of the second functional element relative to the workpiece. The sensor can also be used to reproducibly document the quality of the work.

Preferably, the machine axis in relation to which the second articulated-arm portion can be moved relative to the first articulated-arm portion is the $n^{th}$ machine axis of the robot and n is a natural number which is greater than 2 and preferably equal to 6. The robot hand or, respectively, the second articulated-arm portion can then for example comprise the sixth machine axis, and the robot hand can be connected in the fifth machine axis to the articulated-arm portion which is adjacent in the direction of the base or to the first articulated-arm portion or, if the second articulated-arm portion is the final articulated-arm portion of the articulated arm of the robot, to the penultimate articulated-arm portion.

The $n^{th}$ machine axis or the machine axis of the robot hand can be a rotational axis, a sliding axis or a rotational sliding axis of the second or $k^{th}$ articulated-arm portion or robot hand, wherein the n which is the number of machine axes can represent a natural number other than the k which is the number of articulated-arm portions.

The tool can be a processing tool, for example welding tongs, hollow rivet punching tongs, a polishing device, a material dispensing tool for dispensing for example a fluid material, a material testing tool or some other tool which can be used for executing the assembly task in a verified way.

The tool and/or the second functional element of the tool can be connected to the $n^{th}$ machine axis, directly or via a coupling element or a gear system, etc.

The tool can in particular be designed to convert a system-predetermined movement of the $n^{th}$ machine axis, for example a rotational or linear movement, into a resultant movement of the second functional element, for example a linear or rotational movement, wherein the resultant movement is different to the predetermined movement.

The first functional element and the second functional element can then form a threaded pairing, an intermediate gear system, a sliding block guide or a rigid chain, wherein the first functional element can form a stator, while the second functional element forms a rotor or a tool part which can be moved linearly. The first functional element can for example form a guide for the second functional element, which for example guides the second functional element linearly and/or such that it can be moved rotationally.

The assembly task or production task can in particular be an assembly task or production task within the field of manufacturing, in particular body manufacturing, for flying objects, land vehicles and watercraft. The assembly task can involve connecting two workpieces, filling for example unavoidable assembly gaps, applying markers, compression moulding, breaking open prepared apertures, preparing surfaces for subsequent processing steps, and numerous other tasks.

A second aspect of the invention relates to a method for executing an assembly task or production task in a verified way using a robot, for example an industrial robot, having at least one articulated arm and at least one robot hand which is connected to the articulated arm in a movement axis and has a machine axis which is moved linearly or rotationally, wherein a tool which comprises a first functional element and a second functional element is connected to the articulated arm via the first functional element, the second functional element is coupled to the robot hand, the robot hand is activated and regulated by a robot controller, the movement of the machine axis of the robot hand as predetermined by the robot controller is converted into a resultant movement of the coupled second functional element by the tool, and the assembly task or production task is performed in a verified way by the second functional element. The task can for example involve applying glue, flanging or hemming, welding or some other joining task.

The predetermined movement of the machine axis of the robot hand can for example be one of a linear movement and a rotational movement. The resultant movement of the second functional element is then the other of a linear movement and a rotational movement. The resultant movement can also differ from the predetermined movement of the machine axis solely in its speed, force, etc., while maintaining the predetermined linear or rotational movement. It can preferably be the case that the predefined movement is different to the resultant movement.

In other words, the movement of the final machine axis can be converted into a resultant movement in accordance with the coupling used, the gear system used, the guide used or the force transmission (such as a toggle lever), to name but a few examples, for example: a linear movement into a rotational movement, a rotational movement into a linear movement, a linear movement into a linear movement, a rotational movement into a rotational movement, a linear movement into a linear and rotational movement, or a rotational movement into a rotational and linear movement, wherein the resultant movement preferably differs from the movement of the connected machine axis in at least one parameter, such as for example its speed or force.

The first functional element can then form a guide for the second functional element, which linearly and/or rotationally guides the second functional element. The first functional element can comprise two or more elements which can be moved with respect to each other, for example a telescopic device for protecting the second functional element.

In order for example to monitor the quality of the work performed using the tool, the industrial robot can comprise a sensor device, such as an imaging sensor, which monitors and/or checks the workpiece region being processed by the second functional element before, during and after processing.

The sensor device can be attached to the robot or, respectively, to for example the first articulated-arm portion or first functional element. The second articulated-arm portion and the first functional element can also each comprise a sensor device. Lastly, the sensors can also be placed elsewhere, for example on a separate robot which only bears the sensor device or on a workpiece bracket, as long as they can perform the checking task intended for them.

The system also comprises a controller or regulator for the robot. This can be a robot controller which the robot comprises, for example in its base or arranged next to the robot. The controller or regulator comprises a storage unit and an interface via which programs can be read into the storage unit and modified, for example adapted or updated. The controller can also comprise a computer unit which converts the individual program steps into action commands for the system or, respectively, individual parts of the system. The controller preferably also controls or regulates the function of the optional sensor device and/or a necessary device, such as for example for supplying a pressure medium for opening and/or closing a valve of the tool or for supplying a consumable to the tool, which is/are directly connected to the tool.

The industrial robot used for the method can comprise a base and n machine axes or movement axes for a robot arm having k articulated-arm portions. The $k^{th}$ articulated-arm portion preferably forms the robot hand, wherein the number n of movement axes can be equal to or different to the number k of articulated-arm portions.

The method can in particular be used for assembly tasks within the field of manufacturing, in particular body manufacturing, for flying objects, land vehicles and watercraft. The assembly task can include connecting two workpieces, filling for example unavoidable assembly gaps, applying markers, compression moulding, breaking open prepared apertures, preparing surfaces for subsequent processing steps, and numerous other tasks.

BRIEF DESCRIPTION OF THE DRAWINGS

Example embodiments of the invention are explained in more detail below on the basis of figures. The figures show.

DETAILED DESCRIPTION OF THE INVENTION

Figure 1:
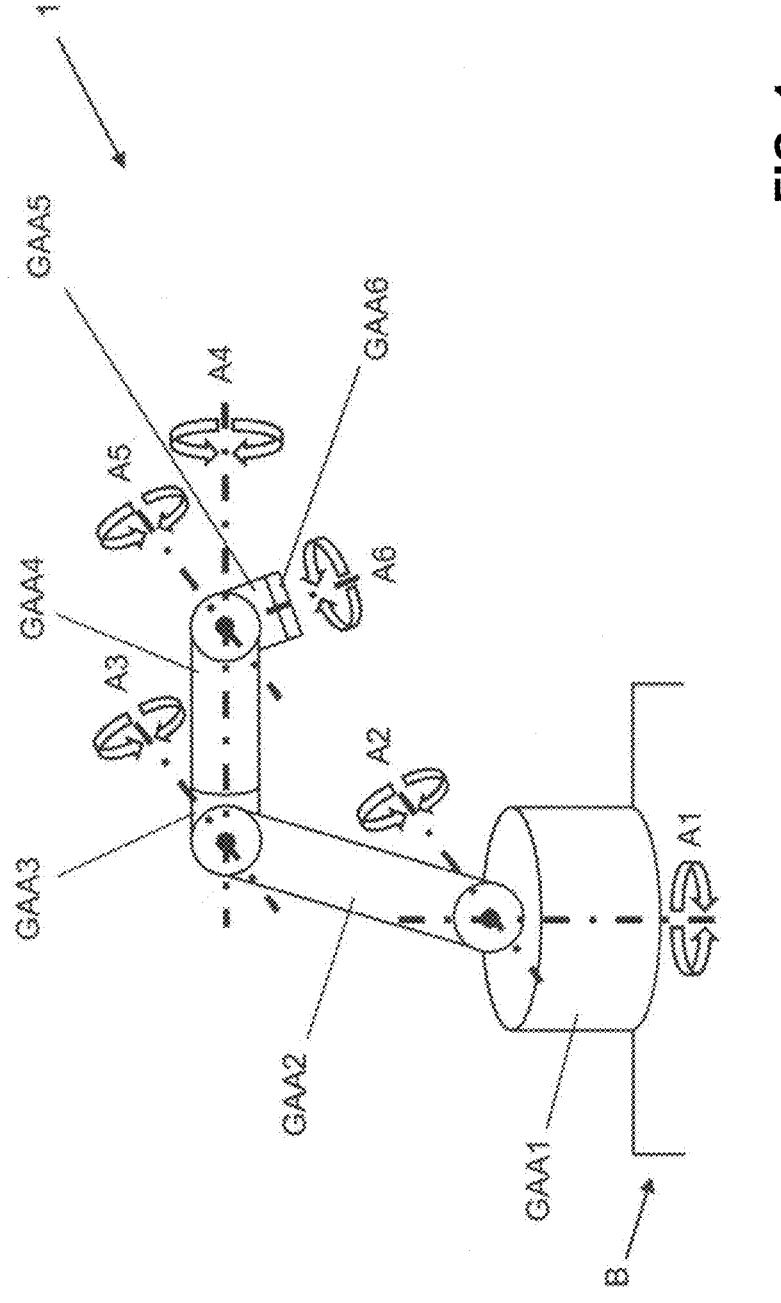
FIG. 1 a schematic representation of a robot having n machine axes and k articulated-arm portions.

FIG. 1 shows an example of an articulated-arm robot 1 such as is used in industry for assembly tasks. The articulated-arm robot 1 can be connected to a base B. The base B can be fixedly connected to for example the floor, wall or ceiling of a hall, such that the articulated-arm robot 1 is installed such that it is spatially fixed. The base B can be designed to be moved on rails or on a ceiling crane, such that the articulated-arm robot 1 can be spatially moved as a whole.

The articulated-arm robot 1 comprises k articulated-arm portions GAA and n machine axes A. Each two articulated-arm portions GAA which are immediately consecutive along the articulated arm are connected to each other in a robot joint such that they can be moved about at least one of the machine axes A each. In the example embodiment, k=n=6. In principle, the number of articulated-arm portions GAA can also deviate from the number of machine axes A and can for example be less than the number of machine axes A, if for example one of the robot joints has more than one degree of freedom of movement, such as for example a spherical joint. In the example embodiment, however, the joints each have only one degree of freedom of movement. They can in particular each be formed as a rotary joint, as is for example common with industrial robots.

The articulated-arm portions GAA are successively denoted, proceeding from the base B up to a free end of the robot arm, by GAA1, GAA2, GAA3, GAA4, GAA5 and GAA6. The machine axes A are successively denoted, proceeding from the base B up to a free end of the robot arm, by A1, A2, A3, A4, A5 and A6. The articulated-arm portion GAA1 rotates about the machine axis A1 which extends through the centre point of the articulated-arm portion GAA1 in the axial direction. The machine axis A2 extends transversely to the machine axis A1 and is a pivot axis in which the articulated-arm portion GAA2 can be pivoted relative to the articulated-arm portion GAA1. The machine axis A3 extends transversely to the machine axis A2 and is a pivot axis in which the articulated-arm portion GAA3 can be pivoted relative to the articulated-arm portion GAA2. The machine axis A4 is a rotational axis of the articulated-arm portion GAA4 relative to the articulated-arm portion GAA3. The machine axis A5 is a pivot axis transverse to the machine axis A4, in which the articulated-arm portion GAA5 can be pivoted relative to the articulated-arm portion GAA4. The final machine axis A6 is a rotational axis in which the final articulated-arm portion GAA6 can be moved rotationally relative to the penultimate articulated-arm portion GAA5.

Figure 2:
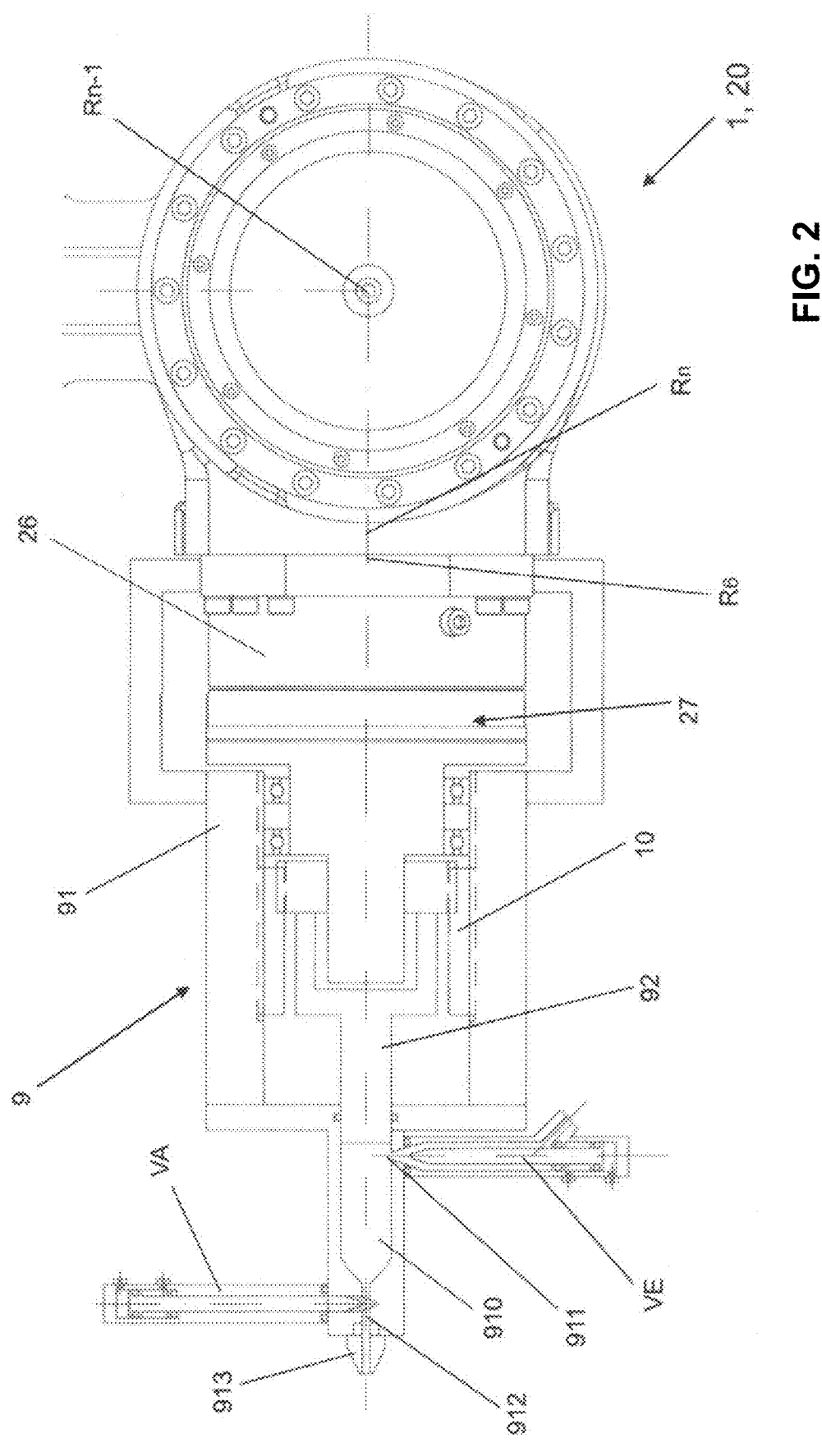
FIG. 2 a tool connected to the $n^{th}$ machine axis and the $k^{th}$ articulated-arm portion.

FIG. 2 shows a first articulated-arm portion 26 and a second articulated-arm portion 27 of an articulated arm 20 of a universal robot or industrial robot 1 having k articulated-arm portions. The robot 1 in FIG. 1 can for example form said universal robot or industrial robot. The second articulated-arm portion 27 can then in particular be the most distant one from a robot base, such as for example the base B in FIG. 1, and in this sense the final articulated-arm portion GAA6, and the first articulated-arm portion 26 can be the penultimate articulated-arm portion GAA5 of the robot 1.

The first articulated-arm portion 26 is connected to the other, second articulated-arm portion 27 in a robot joint which can be pivoted about a machine axis $R_{n-1}$. The second articulated-arm portion 27 has a machine axis $R_n$ which in the example embodiment shown is the sixth machine axis $R_6$ which rotationally drives the second articulated-arm portion 27. The second articulated-arm portion 27 is the final articulated-arm portion of the robot arm 20 and is therefore often also referred to as the robot hand 27.

A tool 9, which comprises a first functional element 91 and a second functional element 92, is connected to the articulated arm 20, wherein the first functional element 91 is connected to the first articulated-arm portion 26, in particular such that it is resistant to movement, i.e. the first functional element 91 follows, in particular directly, all the movements of the first articulated-arm portion 26. In other words, the first functional element 91 is fixedly connected to the first articulated-arm portion 26 and cannot be moved relative to the first articulated-arm portion 26 when connected.

The second functional element 92 is connected to the second articulated-arm portion 27; more specifically, the second functional element 92 is coupled in terms of movement to the machine axis $R_n$ of the second articulated-arm portion 27, wherein the driven machine axis $R_n$ outputs onto the second functional element 92 directly or preferably via a coupling device.

The coupling device is designed such that it converts a predefined movement of the machine axis $R_n$ into a resultant movement of the second functional element 92. In the example embodiment shown, the predetermined movement is a rotational movement or rotation, and the resultant movement is a linear movement or sliding movement, wherein the first functional element 91 forms a guide 10 for the second functional element 92 in the latter's direction of movement.

The first functional element 91 comprises a material chamber 910 which can be filled for example with a fluid material, in order to perform the predetermined assembly task. The material chamber 910 has an inlet 911 for material and an outlet 912 for the material. In the example embodiment shown, the material chamber 910 is connected to a material source for the material used via an inlet valve VE which can be switched pneumatically. The outlet 912 comprises a corresponding outlet valve VA. When the inlet valve VE is opened, to allow material into the material chamber 910, the outlet valve VA is preferably closed. When the outlet valve VA is opened, in order to discharge material from the material chamber 910, the inlet valve VE is preferably closed. When the material chamber 910 is to be purged, the inlet valve VE and the outlet valve VA can be open at the same time.

Figure 3:
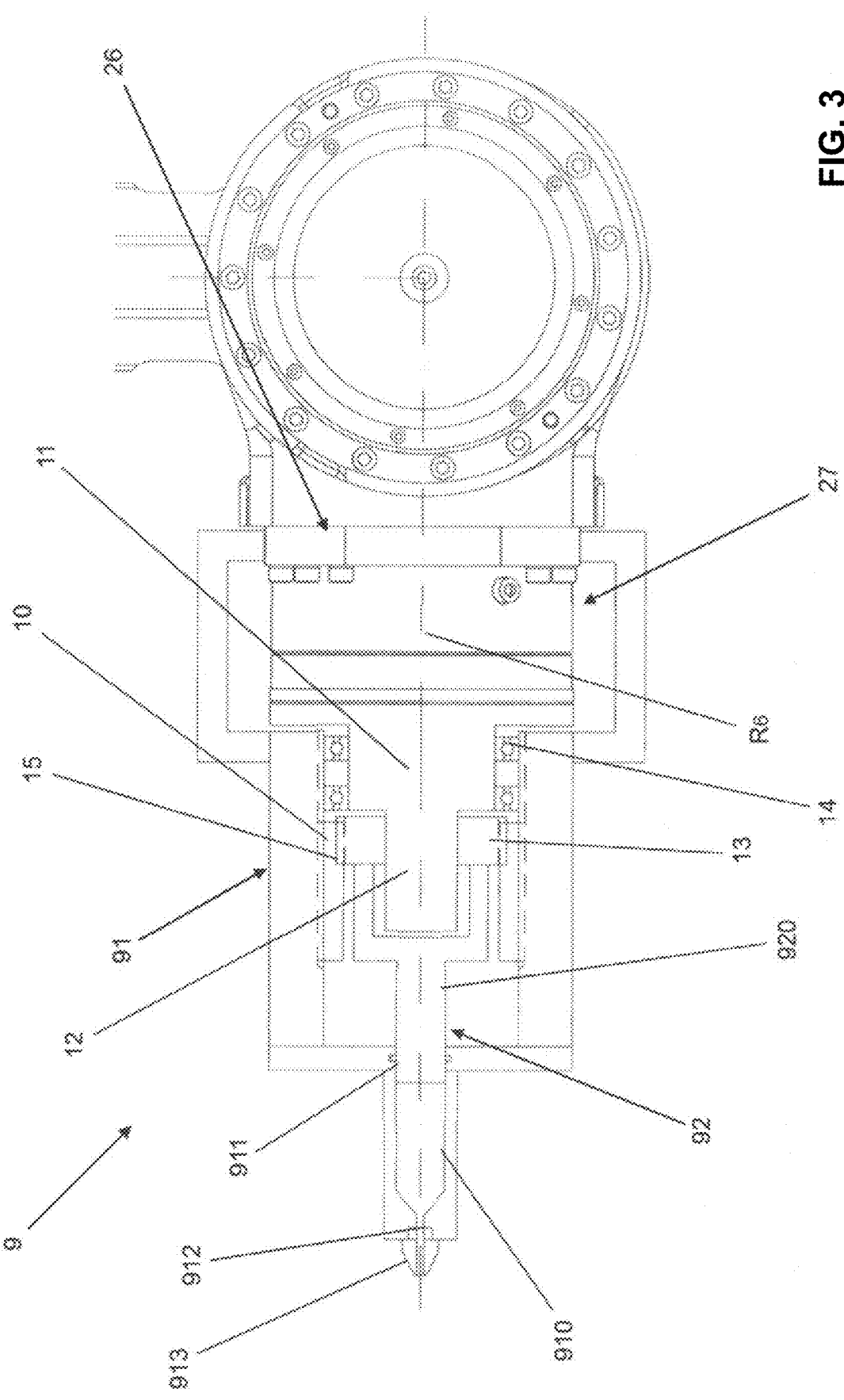
FIG. 3 a tool for dispensing a fluid material, such as a glue, in a verified way.
Figure 4:
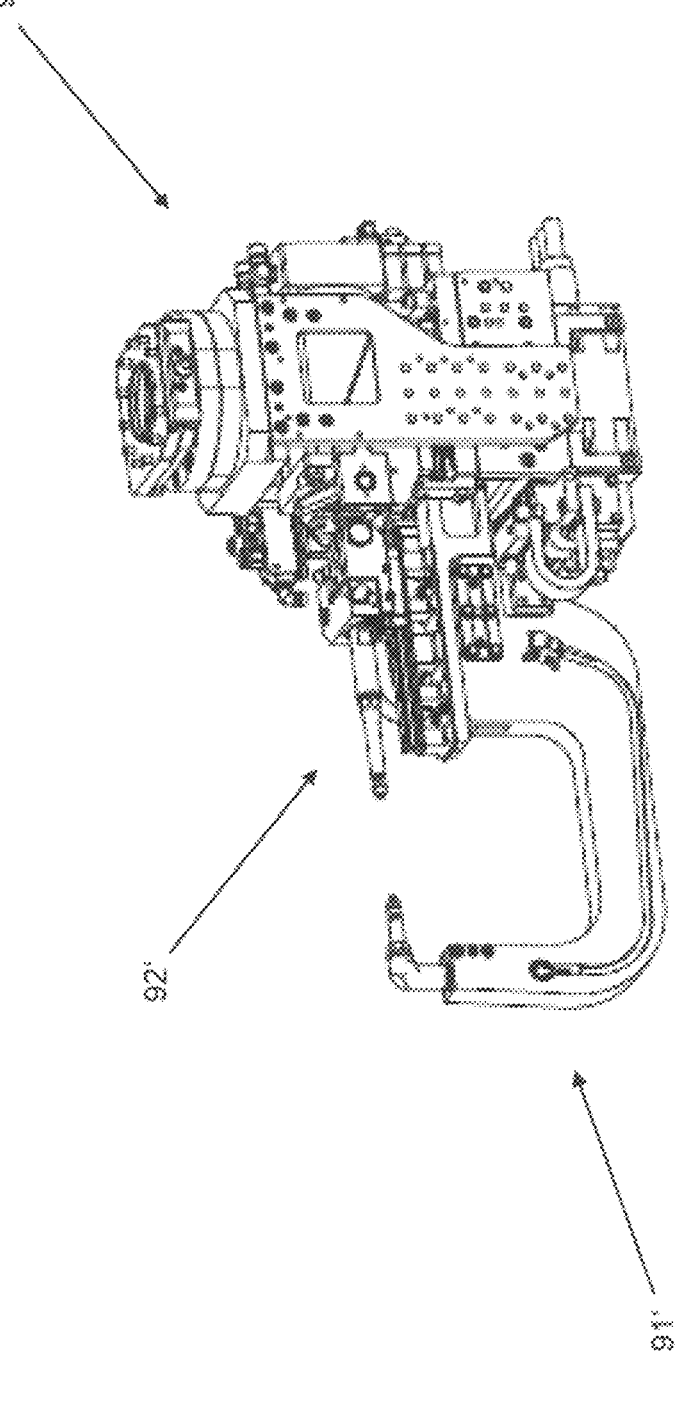
FIG. 4 hollow rivet punching tongs or welding tongs as the tool.

FIGS. 2, 3 and 4 show three example applications of the functional principle in which a tool 9 is connected to a robot 1 as described and the predetermined movement of the machine axis $R_n$, which is connected to a second functional element 92, is converted into a resultant movement of the second functional element 92, wherein the predetermined movement of the respective machine axis $R_n$ is different to the respectively resultant movement of the respective second functional element 92.

In FIG. 3, the tool 9 is a tool using which a fluid material can be dispensed or applied to a workpiece in a verified way. The fluid material can for example be a glue, a paint, a powder, a cleaning agent, etc. which has to be applied to the workpiece at an exact point.

The tool 9 comprises: the first functional element 91 which, as already described, is connected to the first articulated-arm portion 26 such that it is resistant to movement; and the second functional element 92 which is coupled to the machine axis $R_6$ of the second articulated-arm portion 27.

The first functional element 91 comprises a container 910 for the fluid material. The material can be supplied in cartridges which have to be introduced into the container 910. This includes exchanging the cartridges automatically from a connected cartridge magazine.

The container 910 can be refillable, which can mean that material has to be replenished regularly or as necessary, for example manually by an operator, or can mean that it is permanently connected to a material source, and material is replenished automatically into the container 910 according to requirement. Which is the preferred variant depends on the type of assembly task and the amount of material consumed.

The container 910 can be connected to a material source via a conduit system and replenished with material automatically. To this end, the container 910 comprises: an inlet 911 for the material coming from the material source; and an outlet 912 through which the material is dispensed from the container 910. The container 910 can also be connected to two or more material sources, wherein these materials are starting materials which are first mixed in the container 910 to form the material for the assembly task. A mixing device can be arranged in the container 910 for the purpose of mixing, and the container 910 can be heatable or can possess a cooling system. If the container 910 is heatable, a nozzle 913 via which the material is dispensed can also be heatable in order to prevent the material from hardening or thickening before it is applied.

The inlet 911 and the outlet 912 can for example be opened and closed pneumatically. Preferably, the inlet 911 is closed when the outlet 912 is opened, and the outlet 912 is closed when the inlet 911 is opened, i.e. the material cannot be applied directly from the material source to the workpiece.

The first functional element 91 can form a housing of the tool 9, which in particular protects the second functional element 92 from damage and/or soiling. A guide 10 is formed on an inner circumferential wall of the first functional element 91, wherein a travelling nut 13 which acts on the second functional element 92 has the effect of linearly moving the second functional element 92 into the container 910.

The second functional element 92 comprises a discharge piston 920 which extends into the container 910 and can be moved into the container 910 in order to displace material from the container 910 through the outlet 912. The discharge piston 920 is coupled to the machine axis $R_n$ of the second articulated-arm portion 27 via a spindle 11. The spindle 11 is mounted by bearings 14 such that it can be moved rotationally in the first functional element 91 and comprises a free end 12 having an external thread onto which the travelling nut 13 is screwed. The travelling nut 13 comprises guiding elements 15 which co-operate with the guide 10 in the first functional element 91.

If the spindle 11 is then rotationally driven by the machine axis $R_6$ of the second articulated-arm portion 27, the travelling nut 13 cannot rotate along with it, since this is prevented by the connection between the guide 10 and the guiding elements 15. The travelling nut 13 is instead linearly moved along the end 12. Preferably, the travelling nut 13 is fixedly connected to the discharge piston 920 or moulded integrally with it in a casting or sintering process, such that the movement of the travelling nut 13 is transmitted onto the discharge piston 920, i.e. the discharge piston 920 can be moved into or out of the container 910, depending on the rotational direction of the machine axis $R_n$.

In the embodiment of the tool 9 shown in FIG. 3, a rotational axis of the spindle 11, a central longitudinal axis of the second functional element 92 and the rotational axis or machine axis $R_6$ of the second articulated-arm portion 27 coincide.

FIG. 4 shows another tool 9'. Said other tool 9' is a pair of welding tongs, in particular for resistance welding. In the case of this tool 9', the second functional element 92' forms a moving electrode arm, and the first functional element 91' forms a rigid counter-electrode.

In this tool 9', the first functional element 91' is again connected to the first articulated-arm portion 26 such that it participates in every movement of the first articulated-arm portion 26. The second functional element 92' is coupled to the second articulated-arm portion 27 and driven by the machine axis $R_n$ of the second articulated-arm portion 27, wherein the rotational movement of the machine axis $R_6$ is converted into a linear movement of the second functional element 92'. The conversion principle corresponds to the principle described with respect to FIG. 3 and is therefore not described again.

A similar design can for example be used for a pair of hollow rivet punching tongs (not shown), wherein the second functional element can form the driven rivet setting unit, and the anvil is formed by the first functional element.

REFERENCE SIGNS

1 robot, articulated-arm robot, industrial robot
9, 9' tool 10 guide
11 spindle
12 end
13 travelling nut
14 bearing
15 guiding element
20 articulated arm, robot arm
26 first articulated-arm portion
27 second articulated-arm portion, robot hand
91, 91' first functional element
910 material chamber
911 inlet
912 outlet
913 nozzle
92, 92' second functional element
A machine axis
B base
GAA articulated-arm portion
R machine axis
VA outlet valve
VE inlet valve
k number of articulated-arm portions
n number of machine axes or movement axes

The invention claimed is:

1. A system for executing an assembly task or production task in a verified way, the system comprising:
   a. an n-axis robot having a base and an articulated arm which is connected to the base and can be moved in n machine axes relative to the base and comprises a first articulated-arm portion and a second articulated-arm portion which are directly connected in a robot joint such that they can be moved rotationally about one of the machine axes and/or translationally and axially along said machine axis;
   b. a robot controller for controlling and/or regulating the movements of the articulated arm in the n machine axes;
   c. a tool for the assembly task, having a first functional element and a second functional element, wherein
   d. the first functional element is directly coupled to the first articulated-arm portion such that it participates in movements which can be performed by the first articulated-arm portion,
   e. the second functional element is directly coupled to the second articulated-arm portion such that it participates in movements which can be performed by the second articulated-arm portion relative to the first articulated-arm portion and first functional element in the robot joint, in order to execute the assembly task,
   f. and the robot controller is designed to control and/or regulate the position and/or speed of the movements which can be performed by the second articulated-arm portion relative to the first articulated-arm portion in the robot joint, so as to activate a movement and/or function of the second functional element in a verified way.

2. The system according to claim 1, wherein either the first articulated-arm portion or the second articulated-arm portion is a final articulated-arm portion of the robot which is distanced from the base by the n machine axes.

3. The system according to claim 1, wherein the machine axis in relation to which the second articulated-arm portion can be moved relative to the first articulated-arm portion is the nth machine axis of the robot and n is a natural number which is greater than 2.

4. The system according to claim 3, wherein n is equal to 6.

5. The system according to claim 1, wherein the $n^{th}$ machine axis is a rotational axis, a sliding axis or a rotational sliding axis of the second articulated-arm portion.

6. The system according claim 1, wherein the tool is a processing tool, a polishing device, an applying or dispensing tool for dispensing a material, or a material testing tool.

7. The system according to claim 6, wherein the tool is a welding tongs or an applying or dispensing tool for dispensing a fluid material.

8. The system according to claim 1, wherein the $n^{th}$ machine axis is or can be connected to the second functional element, directly or via a coupling element.

9. The system according to claim 1, wherein the tool is designed to convert a system-predetermined movement of the $n^{th}$ machine axis, into a resultant movement of the second functional element (92), wherein the resultant movement is different to the predetermined movement.

10. The system according to claim 9, wherein the system-predetermined movement of the $n^{th}$ machine axis is a rotational or linear movement, and/or wherein the resultant movement of the second functional element is a linear or rotational movement.

11. The system according to claim 1, wherein the first functional element and the second functional element form a threaded pairing, an intermediate gear system, a sliding block guide or a rigid chain.

12. The system according to claim 1, wherein the first functional element forms a guide for the second functional element.

13. The system according to claim 12, wherein the first functional element guides the second functional element linearly and/or such that it can be moved rotationally.

14. The system according to claim 1, wherein the second articulated-arm portion is a robot hand.

15. The system according to claim 1, wherein the assembly task is an assembly task within the field of manufacturing for flying objects, land vehicles and watercraft.

16. The system according to claim 15, wherein the assembly task is an assembly task within the field of body manufacturing for flying objects, land vehicles and watercraft.

17. A method for executing an assembly task or production task using the system according to claim 14, wherein the second functional element is coupled to the robot hand, the method comprising:
   activating and regulating the robot hand with a robot controller,
   converting movement of the robot hand as predetermined by the robot controller into a resultant movement of the coupled second functional element by the tool, and
   performing the assembly task or the production task in a verified way by the second functional element.

18. The method according to claim 17, wherein the predetermined movement of the robot hand is one of a linear movement and a rotational movement, and the resultant movement of the second functional element is the other of a linear movement and a rotational movement.

19. The method according to claim 17, wherein the second functional element is guided linearly or rotationally by the first functional element.

20. The method according to claim 17, wherein the industrial robot has a base and n movement axes for a robot arm having k articulated-arm portions, and the kth articulated-arm portion forms the robot hand.

* * * * *